(12) United States Patent
Boydell et al.

(10) Patent No.: US 9,676,557 B2
(45) Date of Patent: Jun. 13, 2017

(54) ELEVATOR PADDLE DESIGN TO OPTIMIZE SAMPLE BYPASS COLLECTION

(71) Applicant: Deere & Company, Moline, IL (US)

(72) Inventors: Broughton C. Boydell, Pallamallawa (AU); Frederick W. Nelson, Waukee, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/871,449

(22) Filed: Sep. 30, 2015

(65) Prior Publication Data

US 2017/0088357 A1    Mar. 30, 2017

(51) Int. Cl.
| | |
|---|---|
| B65G 19/22 | (2006.01) |
| B65G 19/14 | (2006.01) |
| A01F 12/46 | (2006.01) |
| A01D 41/12 | (2006.01) |
| A01D 61/00 | (2006.01) |

(52) U.S. Cl.
CPC ............ *B65G 19/22* (2013.01); *A01D 41/12* (2013.01); *A01D 61/002* (2013.01); *A01F 12/46* (2013.01); *B65G 19/14* (2013.01)

(58) Field of Classification Search
USPC ................ 198/711, 712, 718, 728, 734
See application file for complete search history.

(56) References Cited

U.S. PATENT DOCUMENTS

| | | | | |
|---|---|---|---|---|
| 3,399,637 A | * | 9/1968 | Hirschfield | B01J 8/002 110/245 |
| 4,230,222 A | * | 10/1980 | Clark | B65G 45/26 198/494 |
| 4,972,665 A | | 11/1990 | Hicks | |
| 6,285,198 B1 | | 9/2001 | Nelson et al. | |
| 6,418,805 B1 | * | 7/2002 | Carney | A01D 41/127 374/142 |
| 6,686,749 B2 | | 2/2004 | Rains et al. | |
| 2012/0253611 A1 | | 10/2012 | Zielke et al. | |

FOREIGN PATENT DOCUMENTS

| | | |
|---|---|---|
| FR | 2801380 A1 | 5/2001 |
| WO | 2014113805 A1 | 7/2014 |
| WO | 2014205455 A1 | 12/2014 |

OTHER PUBLICATIONS

Mark Moore, Yield Sensors, Silsoe College, 1997, Chapter 3, http://www.ufrrj.br/institutos/it/deng/varella/Downloads/IT190_principios_em_agricultura_de_precisao/literatura/thesis%20moore/Yield%20sensors.pdf.
Search Report dated Feb. 27, 2017 for Great Britain Patent Application No. GB 1614640.9.

\* cited by examiner

*Primary Examiner* — Gene Crawford
*Assistant Examiner* — Lester Rushin
(74) *Attorney, Agent, or Firm* — James P. Muraff; Neal, Gerber & Eisenberg LLP

(57) ABSTRACT

A grain elevator system and method are disclosed, where the grain elevator system includes a grain elevator, a grain elevator paddle, and/or a grain elevator paddle insert. When the grain elevator system includes a sensor attached to a side of the grain elevator, the grain elevator paddle may be configured to include a divider piece for biasing grain towards the side of the grain elevator having the sensor attached. When the grain elevator system includes a sensor attached to a side of the grain elevator, a grain elevator paddle insert may be positioned on top of the grain elevator paddle for biasing grain towards the side of the grain elevator having the sensor attached.

20 Claims, 6 Drawing Sheets

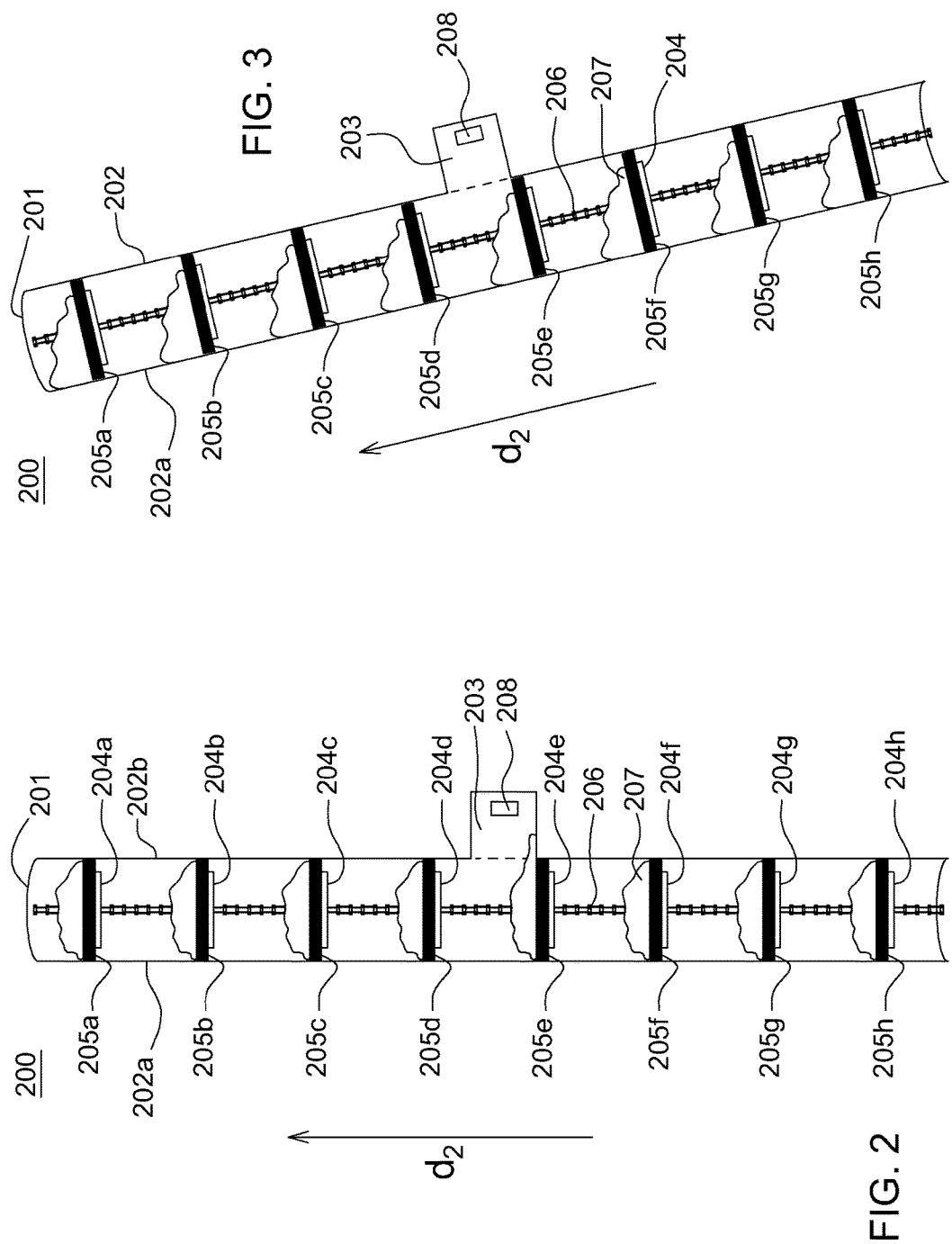

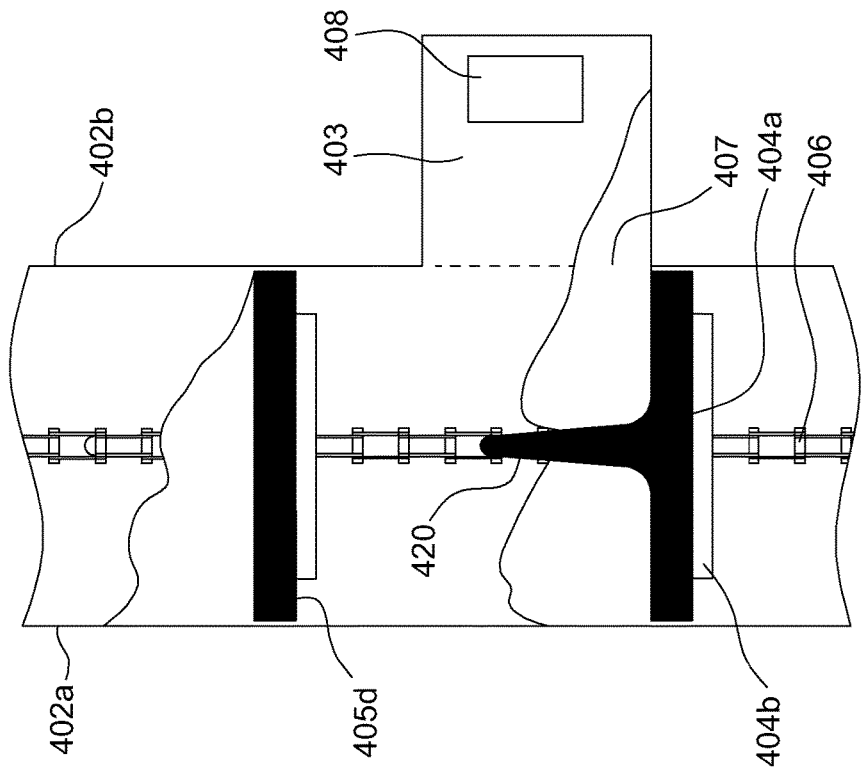
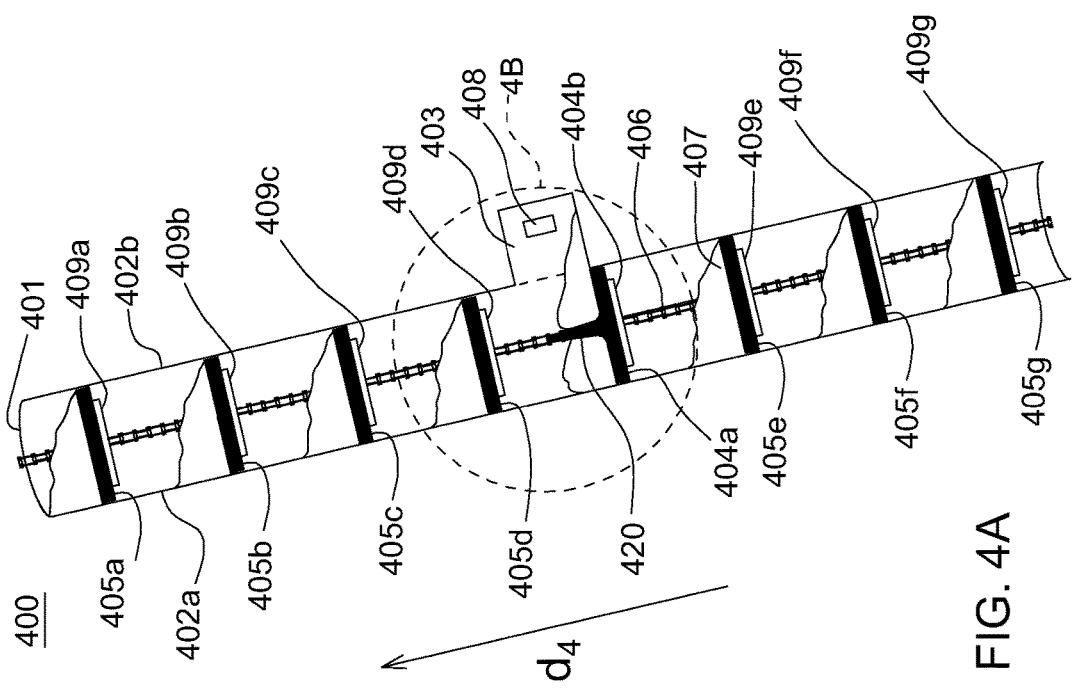

ELEVATOR PADDLE DESIGN TO OPTIMIZE SAMPLE BYPASS COLLECTION

TECHNICAL FIELD

This disclosure relates to a grain elevator and a grain elevator paddle utilized within the grain elevator configured to optimize collection of crop samples being transported on the grain elevator.

BACKGROUND

Grain elevators are used to transport harvested crops, such as grains (e.g., wheat, rye, beans, rice, corn, etc.), between different storage containers. For example, grain harvested from a combine may be transported from a temporary storage container (e.g., a cleaning shoe) connected to the combine, to a more permanent storage container on the combine (e.g., grain tank) or to a more permanent storage container following alongside the combine. As an added feature to the grain elevator, some applications may include one or more sensors attached to a side of the grain elevator to sense and obtain characteristics of the crop being harvested.

It follows that for applications where sensors are included on the grain elevator, a grain elevator configuration that ensures adequate grain samples will reach the sensors is desirable.

SUMMARY

The present disclosure describes, according to some embodiments, a grain elevator paddle assembly is disclosed for transporting grain on a grain elevator having a grain elevator drive. The grain elevator paddle assembly comprising a paddle base comprising a paddle base transporter and a paddle base connector, the paddle base connector configured to engage with a drive connector of the grain elevator drive via a fastener. The grain elevator paddle assembly may further comprise a paddle divider configured to define a first paddle base side and a second paddle base side of the paddle base transporter, wherein the second paddle base side corresponds to a side of the grain elevator configured to have an opening to a sampling receptacle.

BRIEF DESCRIPTION OF THE DRAWINGS

The present subject matter disclosure will be described by way of exemplary embodiments but not limitations, illustrated in the accompanying drawings in which like references denote similar elements, and in which:

FIG. 2 illustrates a grain elevator that may be included in the combine system of FIG. 1, according to some embodiments.

FIG. 3 illustrates the grain elevator illustrated in FIG. 2 in a slanted state.

FIG. 4A illustrates a grain elevator that may be included in the combine system of FIG. 1, according to some embodiments.

FIG. 4B illustrates a magnified view of a viewing window 4B corresponding to a portion of the grain elevator illustrated in FIG. 4A.

DETAILED DESCRIPTION

Figure 1:
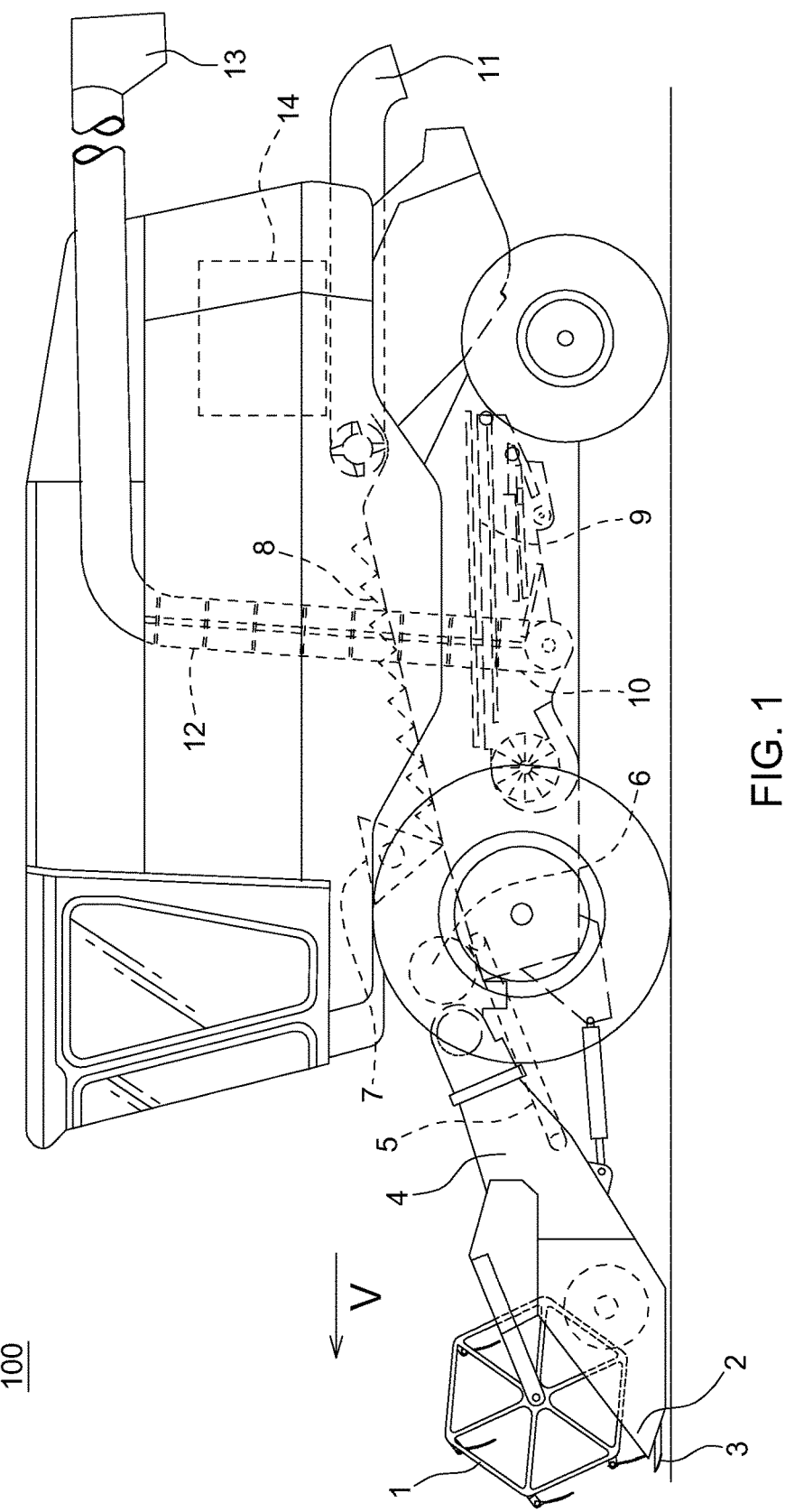
FIG. 1 illustrates a combine system including a grain elevator in accordance to an embodiment.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects, or may be practiced with additional aspects from those expressly described herein. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

The present disclosure describes an updated paddle design and a paddle insert for use in a grain elevator where the updated paddle design and the paddle insert are configured to promote grain flow towards a side of a grain elevator having a sampling receptacle attached to it, where the sampling receptacle includes a sensor for sensing characteristics of grain that enters into the sampling receptacle. This feature is desirable to promote grain flow towards the side of the grain elevator having the sampling receptacle attached to it when the grain elevator is slanted down and away from the side of the grain elevator having a sampling receptacle attached to it.

According to some embodiments, a grain elevator paddle assembly for transporting grain on a grain elevator having a grain elevator drive is disclosed. The grain elevator paddle assembly comprising a paddle base comprising a paddle base transporter and a paddle base connector, the paddle base connector configured to engage with a drive connector via a fastener. The grain elevator paddle assembly may further comprise an angled paddle insert configured to rest on top of the paddle base transporter and comprising a slope angled downwards from a first paddle base side to a second paddle base side, wherein the second paddle base side corresponds to a side of the grain elevator configured to have an opening to a sampling receptacle.

According to some embodiments, a grain elevator paddle insert of a grain elevator is disclosed. The grain elevator paddle insert comprising an angled paddle insert configured to be placed on top of a paddle base and comprising a slope angled downwards from a first insert side to a second insert side, wherein the second paddle base side corresponds to a side of the grain elevator configured to have an opening to a sampling receptacle.

A crop harvesting combine may be configured to harvest crop planted in a harvesting field. Harvesting the crop may entail operating the crop harvesting combine to harvest the crop and transport the harvested crop to another larger container traveling besides the crop harvesting combine. To transport the harvested crop from the crop harvesting combine to the larger container running besides the crop harvesting combine, a grain elevator may be employed on the crop harvesting combine. As an added feature of the grain elevator, sampling receptacles including a sensor may be attached to a side of the grain elevator. The sampling receptacles are configured to receive a portion of the harvested grain, where the sensor may then sense a characteristic of the grain that has entered into the sampling receptacle. Because the crop harvesting combine is used in the field that may include uneven surfaces, the grain elevator may not always be level. In other words, due to the uneven nature of the field, the grain elevator may find itself tilted such that grain being transported on the grain elevator may be biased away from entering the sampling receptacle due to gravity. It follows that an updated paddle design or paddle insert is disclosed for offsetting such situations by promoting grain to enter into the sampling receptacle even when the grain elevator is tilted away from the sampling receptacle side.

This disclosure will refer to the crop as a grain crop. However, other types of crop may be harvested according to other embodiments of the systems, apparatuses, and methods described herein.

FIG. 1 illustrates a combine system 100 for harvesting grain from a field. The combine system 100 comprises a revolving reel 1 for pushing the grain crop planted in the field towards a cutter bar 3, where the cutter bar 3 comprises a plurality of teeth configured to cut off the grain crop at their base. The combine system 100 further comprises a header divider 2 for defining a row of grain crops that will be harvested by the combine system 100, a feeder 4 configured to accept the grain crop after it has been cut by the cutter bar 3, a conveyor 5 configured to transport the grain crop from the feeder 4 to an internal chamber of the combine system 100, a threshing drum 6 configured to beat/thresh the grain crop traveling on the conveyor 5 to break and shake grain from the stalk portion (i.e., the straw chaff) of the grain crop, a beater 7 configured to further beat/thresh the grain crop traveling on the conveyor 5 to break and shake grain from the straw chaff, a shaking screen 8 configured to separate the grain from the straw chaff by shaking the grain crop such that the straw chaff remains on the shaking screen 8 and is disposed of out of a rear chaff outlet 11 of the combine system 100, while the grain is able to fall down towards the grain sieve 9. The grain sieve 9 further separates the grain from any remaining straw chaff portions. After falling through the grain sieve 9, grain is collected in a holding tank 10. Grain collected in the holding tank 10 is then transported on a grain elevator 12 to be offloaded through a grain outlet 13. The grain may be offloaded onto a tractor or container traveling alongside the combine system 100, where the tractor or container is able to hold a larger amount of grain than the holding tank 10 within the combine system 100.

Combine system 100 also includes an engine compartment 14 configured to house one or more engines and engine components for powering the various drives and motors within the combine system 100. The combine system 100 may include fewer, or additional, components than specifically illustrated in FIG. 1 and still be able to achieve the features described herein.

FIG. 2 illustrates a grain elevator 200 for use in a combine system. The grain elevator 200 may, for example, correspond to grain elevator 12 of combine system 100 illustrated in FIG. 1.

Grain elevator 200 is comprised of a paddle base unit positioned between a first elevator wall 202a and a second elevator wall 202b, where the paddle base unit is attached to an elevator drive (e.g., elevator chain) 206 for rotating the paddle base unit in direction $d_2$ up towards an elevator opening 201. More specifically, the paddle base unit is comprised of a plurality of paddle plates 204a-204h attached to the elevator drive 206, and a plurality of paddles 205a-205h configured to attach to the plurality of paddle plates 204a-204h. With this design, rotation of the elevator drive 206 enables the plurality of paddles 205a-205h to transport grain 207 from a starting end of the grain elevator 200 up towards elevator opening 201 in direction $d_2$. Elevator opening 201 may, for example, correspond to, or lead towards, the grain outlet 13 of combine system 100.

Grain elevator 200 is also comprised of an opening on the second elevator wall 202b that opens to a sampling receptacle 203 attached to the second elevator wall 202b. The sampling receptacle 203 may include a sensor 208 configured to sense a characteristic of grain 207 that flows into the sampling receptacle 203. Sensor 208 may, for example, be a moisture sensor configured to sense a moisture level of grain 207 that enter into the sampling receptacle 203. In addition or alternatively, sensor 208 may be an infrared sensor configured to sense protein or starch level characteristics of grain 207 that enter into the sampling receptacle 203. In addition or alternatively, sensor 208 may be a video recorder configured to record grain 207 that enter into the sampling receptacle 203 so that the recording may be analyzed by a video processing unit comprised of a processor, memory, and video processing software stored on the memory and executed by the processor. The analysis of the recording may identify physical characteristics of grain 207 that enter into the sampling receptacle 203 such as damage to the grains themselves.

FIG. 3 illustrates the grain elevator 200 illustrated in FIG. 2. However, in FIG. 3 grain elevator 200 is situated to be leaning towards the side corresponding to first elevator wall 202a. It follows that grain 207 that would have entered into sampling receptacle 203 when grain elevator 200 was relatively upright, as illustrated in FIG. 2, may not be able to reach into sampling receptacle 203 when grain elevator 200 is leaned towards the first elevator wall 202a side as illustrated by FIG. 3.

To cure the deficiency of the paddle design for the paddles 205a-205h illustrated in grain elevator 200, FIG. 4A illustrates a grain elevator 400 that includes an updated paddle 404a configured to promote the flow of grain 407 into a sampling receptacle 403 when the grain elevator 400 is in a slanted configuration away from the side where the sampling receptacle 403 is attached to the grain elevator 400.

FIG. 4A illustrates grain elevator 400 for use in a combine system. The grain elevator 400 may, for example, correspond to grain elevator 12 of combine system 100 illustrated in FIG. 1.

Grain elevator 400 is comprised of a paddle base unit positioned between a first elevator wall 402a and a second elevator wall 402b, where the paddle base unit is attached to an elevator drive (e.g., elevator chain) 406 for rotating the paddle base unit in direction $d_4$ up towards an elevator opening 401. More specifically, the paddle base unit is comprised of a plurality of paddle plates 409a-409g attached to the elevator drive 406, and a plurality of paddles 405a-405g configured to attach to the plurality of paddle plates 409a-409g. The plurality of paddle plates 409a-409g may be the same, or similar, to the plurality of paddle plates 204a-204h described in FIG. 2 and FIG. 3. The plurality of paddles 405a-405g may be the same, or similar, to the plurality of paddles 205a-205h described in FIG. 2 and FIG. 3. In addition, grain elevator 400 includes updated paddle 404a configured to attach to updated paddle plate 404b.

Further description of the updated paddle 404a will be provided in more detail below.

With this design, rotation of the elevator drive 406 enables the plurality of paddles 405a-405g and the updated paddle 404a to transport grain 407 from a starting end of the grain elevator 400 up towards elevator opening 401 in direction $d_4$. Elevator opening 401 may, for example, correspond to, or lead towards, the grain outlet 13 of combine system 100.

Grain elevator 400 is also comprised of an opening on the second elevator wall 402b that opens to a sampling receptacle 403 attached to the second elevator wall 402b. The sampling receptacle 403 may include a sensor 408 configured to sense a characteristic of grain 407 that flows into the sampling receptacle 403. Sensor 408 may, for example, be a moisture sensor configured to sense a moisture level of grain 407 that enter into the sampling receptacle 403. In addition or alternatively, sensor 408 may be an infrared sensor configured to sense protein or starch level characteristics of grain 407 that enter into the sampling receptacle 403. In addition or alternatively, sensor 408 may be a video recorder configured to record grain 407 that enter into the sampling receptacle 403 so that the recording may be analyzed by a video processing unit comprised of a processor, memory, and video processing software stored on the memory and executed by the processor. The analysis of the recording may identify physical characteristics of grain 407 that enter into the sampling receptacle 403 such as damage to the grains themselves.

Referencing the updated paddle 404a, updated paddle 404a includes a divider portion 420 formed in the middle, or substantially in the middle, of updated paddle 404a. The divider portion 420 may be a wall protruding from the middle, or substantially from the middle, of updated paddle 404a. The divider portion 420 is positioned and designed to allow a first portion of grain 407 to be transported on a first side of updated paddle 404a corresponding to the first elevator wall 402a, and a second portion of grain 407 to be transported on a second side of updated paddle 404a corresponding to the second elevator wall 402b side. By positioning the divider portion 420 in the middle, or substantially in the middle, of updated paddle 404a, grain 407 being transported on the second side of updated paddle 404a corresponding to the second elevator wall 402b side is advanced towards the sampling receptacle 403 and has a higher likelihood of flowing through the hole of the second elevator wall 402b to enter into sampling receptacle 403. Updated paddle 404a is configured to achieve this by adding the divider portion 420 which serves as an additional wall positioned closer to the second elevator wall 402b side. This feature of updated paddle 404a is especially beneficial when grain elevator 400 is slanted down such that grain 407 would naturally flow away from the second elevator wall 402b side due to gravity, as illustrated in FIG. 4A.

FIG. 4B illustrates a magnified view of viewing window 4B corresponding to FIG. 4A. In FIG. 4B, the grain 407 laying on top of paddle 405d is shown to be piled against the first elevator wall 402a due to the leaning of grain elevator 400 down towards the first elevator wall 402a side. FIG. 4B further illustrates that grain 407 laying on top of updated paddle 404a is divided by the divider portion 420 positioned in the middle, or substantially in the middle, of updated paddle 404a. The divider portion 420 of updated paddle 404a is configured to provide an additional wall positioned closer to the second elevator wall 402b side so that grain 407 positioned on top of the second side of updated paddle 404a is more likely to fall through the hole on the second elevator wall 402b and enter into the sampling receptacle 403. This feature of updated paddle 404a is especially beneficial when grain elevator 400 is slanted down such that grain 407 would otherwise naturally flow away from the second elevator wall 402b side as illustrated in FIG. 4A.

Figure 4C:
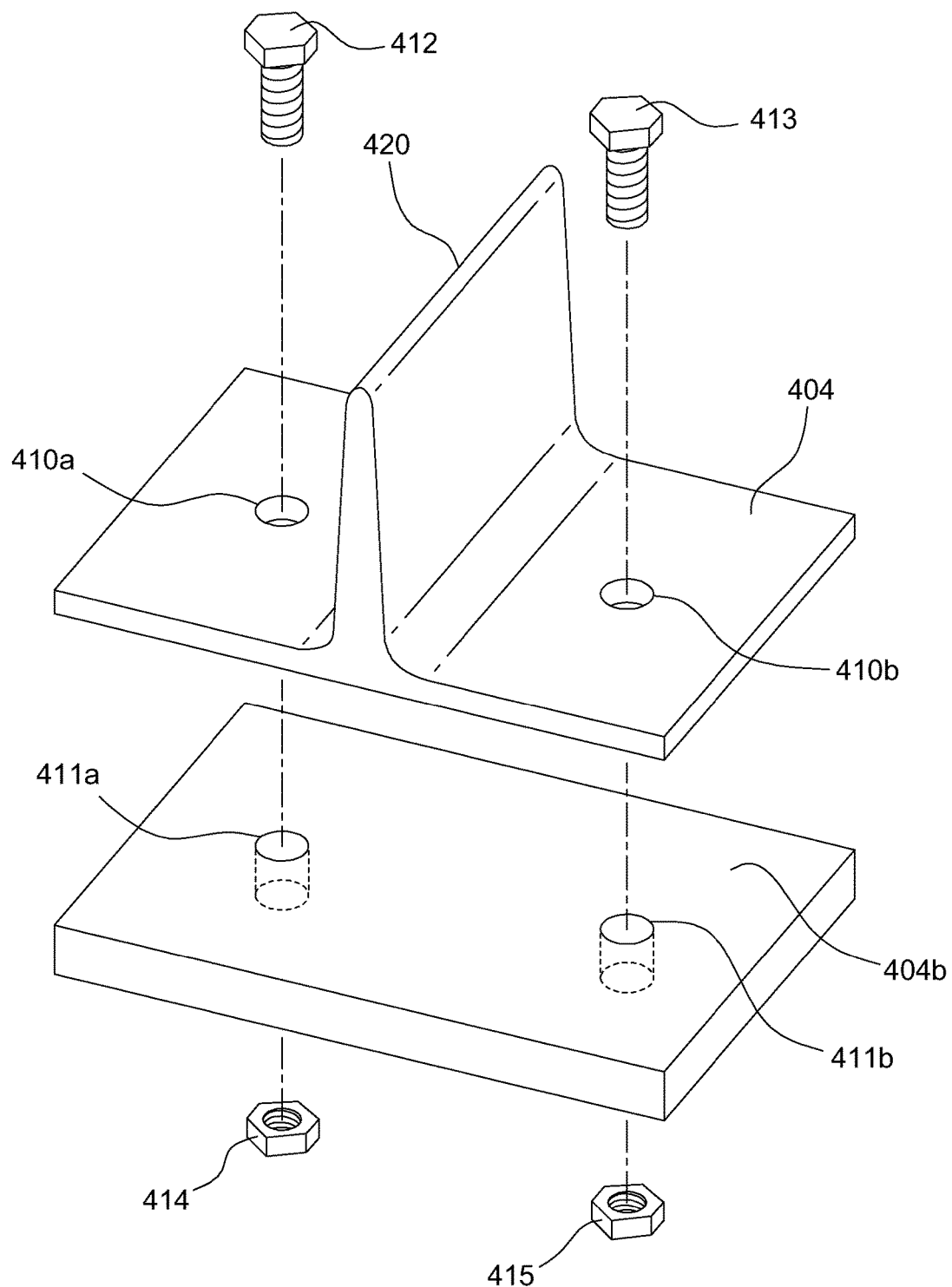
FIG. 4C is an exploded view of a grain elevator paddle included in the grain elevator illustrated in FIG. 4A.

FIG. 4C illustrates an exploded view of the paddle base unit corresponding to updated paddle plate 404b and updated paddle 404a. Updated paddle 404a includes first paddle opening 410a and second paddle opening 410b for receiving first fastener 412 and second fastener 413, respectively, through them. Updated paddle plate 404b includes first paddle plate opening 411a and second paddle plate opening 411b for receiving first fastener 412 and second fastener 413, respectively, through them. First fastener ending 414 and second fastener ending 415 are configured to screw onto ends of first fastener 412 and second fastener 413, respectively, to effectively attach the updated paddle 404a to the updated paddle plate 404b. According to some embodiments, first fastener 412 and second fastener 413 may be a bolt or screw, and first fastener ending 414 and second fastener ending 415 may be a nut for screwing onto an end of the first fastener 412 and second fastener 413.

Although updated paddle 404a is illustrated in FIG. 4A as being attached only to updated paddle plate 404b, according to other embodiments updated paddle 404a may be attached to one or more of the plurality of paddle plates 409a-409g.

Figure 5B:
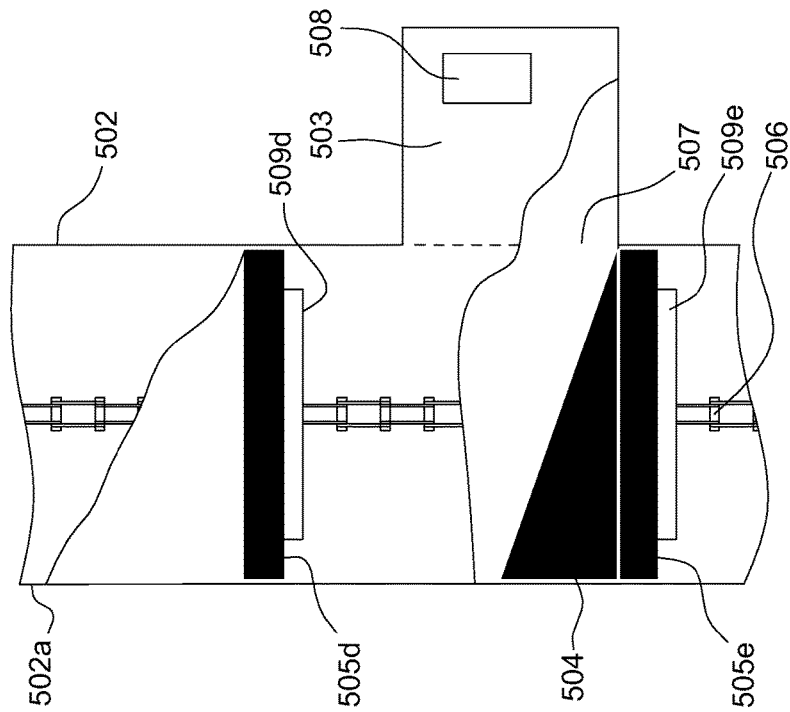
FIG. 5B illustrates a magnified view of a viewing window 4B corresponding to a portion of the grain elevator illustrated in FIG. 5A.
Figure 5A:
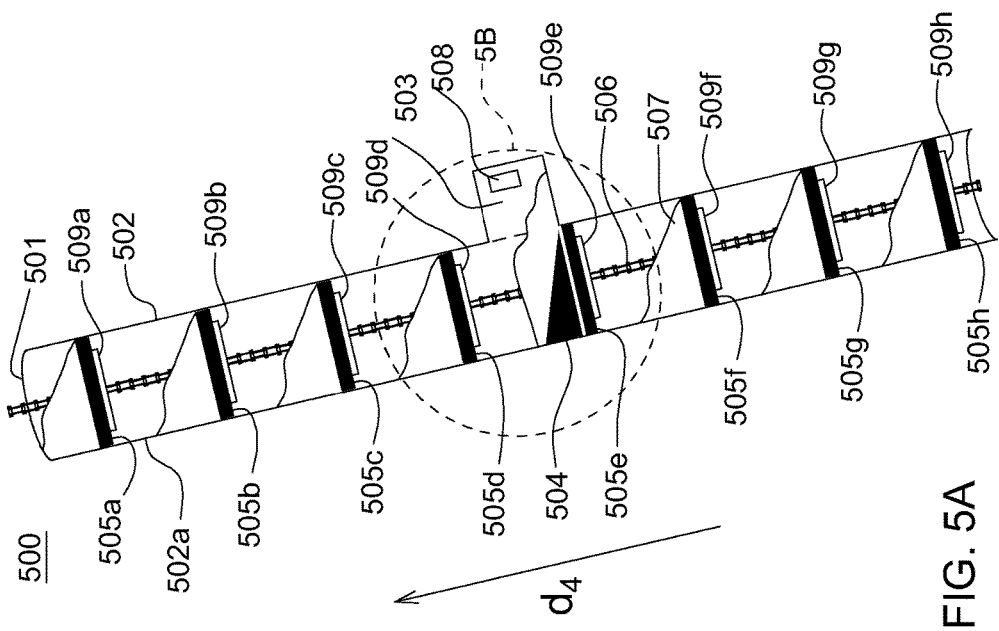
FIG. 5A illustrates a grain elevator that may be included in the combine system of FIG. 1, according to some embodiments.

To cure the deficiency of the paddle design for the paddles 205a-205h illustrated in grain elevator 200, FIG. 5A illustrates a grain elevator 500 that includes a paddle insert 504 configured to promote the flow of grain 507 into a sampling receptacle 503 when the grain elevator 500 is in a slanted configuration away from the side where the sampling receptacle 503 is attached to the grain elevator 500.

FIG. 5A illustrates grain elevator 500 for use in a combine system. The grain elevator 500 may, for example, correspond to grain elevator 12 of combine system 100 illustrated in FIG. 1.

Grain elevator 500 is comprised of a paddle base unit positioned between a first elevator wall 502a and a second elevator wall 502b, where the paddle base unit is attached to an elevator drive (e.g., elevator chain) 506 for rotating the paddle base unit in direction $d_5$ up towards an elevator opening 501. More specifically, the paddle base unit is comprised of a plurality of paddle plates 509a-509h attached to the elevator drive 506, and a plurality of paddles 505a-505h configured to attach to the plurality of paddle plates 509a-509h. The plurality of paddle plates 509a-509h may be the same, or similar, to the plurality of paddle plates 204a-204h described in FIG. 2 and FIG. 3. The plurality of paddles 505a-505h may be the same, or similar, to the plurality of paddles 205a-205h described in FIG. 2 and FIG. 3. In addition, grain elevator 500 includes paddle insert 504 configured to attach to paddle 505e. Further description of the paddle insert 504 will be provided in more detail below.

With this design, rotation of the elevator drive 506 enables the plurality of paddles 505a-505h and the paddle insert 504 to transport grain 507 from a starting end of the grain elevator 500 up towards elevator opening 501 in direction $d_5$. Elevator opening 501 may, for example, correspond to, or lead towards, the grain outlet 13 of combine system 100.

Grain elevator 500 is also comprised of an opening on the second elevator wall 502b that opens to a sampling receptacle 503 attached to the second elevator wall 502b. The sampling receptacle 503 may include a sensor 508 configured to sense a characteristic of grain 507 that flows into the sampling receptacle 503. Sensor 508 may, for example, be a moisture sensor configured to sense a moisture level of grain 507 that enter into the sampling receptacle 503. In addition or alternatively, sensor 508 may be an infrared sensor configured to sense protein or starch level characteristics of grain 507 that enter into the sampling receptacle 503. In addition or alternatively, sensor 508 may be a video recorder configured to record grain 507 that enter into the sampling receptacle 503 so that the recording may be analyzed by a video processing unit comprised of a processor, memory, and video processing software stored on the memory and executed by the processor. The analysis of the recording may identify physical characteristics of grain 507 that enter into the sampling receptacle 503 such as damage to the grains themselves.

Referencing the paddle insert 504, paddle insert 504 is configured to slant downwards towards a side corresponding to either the first elevator wall 502a or the second elevator wall 502b that has the sampling receptacle 503 attached to it. In the embodiments illustrated by FIG. 5A, the paddle insert 504 is configured to slant down towards the second elevator wall 502b as the sampling receptacle is attached to the second elevator wall 502b. The slanting design of the paddle insert allows grain 507 being transported on top of the paddle insert 504 to be advanced towards sampling receptacle 503 and have a higher likelihood of flow through the hole on the second elevator wall 502b and enter the sampling receptacle 503. The slope of the paddle insert 504 may be 30 degrees below horizontal, 60 degrees below horizontal, or any other angle in-between when the paddle insert 504 is laying on a horizontal surface. This feature of the paddle insert 504 is especially beneficial when grain elevator 500 is slanted down such that grain 507 would naturally flow away from the second elevator wall 502b side due to gravity, as illustrated in FIG. 5A.

FIG. 5B illustrates a magnified view of viewing window 5B corresponding to FIG. 5A. In FIG. 5B, the grain 507 laying on top of paddle 505d is shown to be piled against the first elevator wall 502a due to the leaning of grain elevator 500 down towards the first elevator wall 502a side. FIG. 5B further illustrates that the slope of paddle insert 504 advances grain 507 laying on top of paddle insert 504 to flow down the slope and towards the opening in the second elevator wall 502b and enter the sampling receptacle 503, even when grain elevator 500 is slanted down such that grain 507 would otherwise naturally flow away from the second elevator wall 502b side as illustrated in FIG. 5A.

Figure 5C:
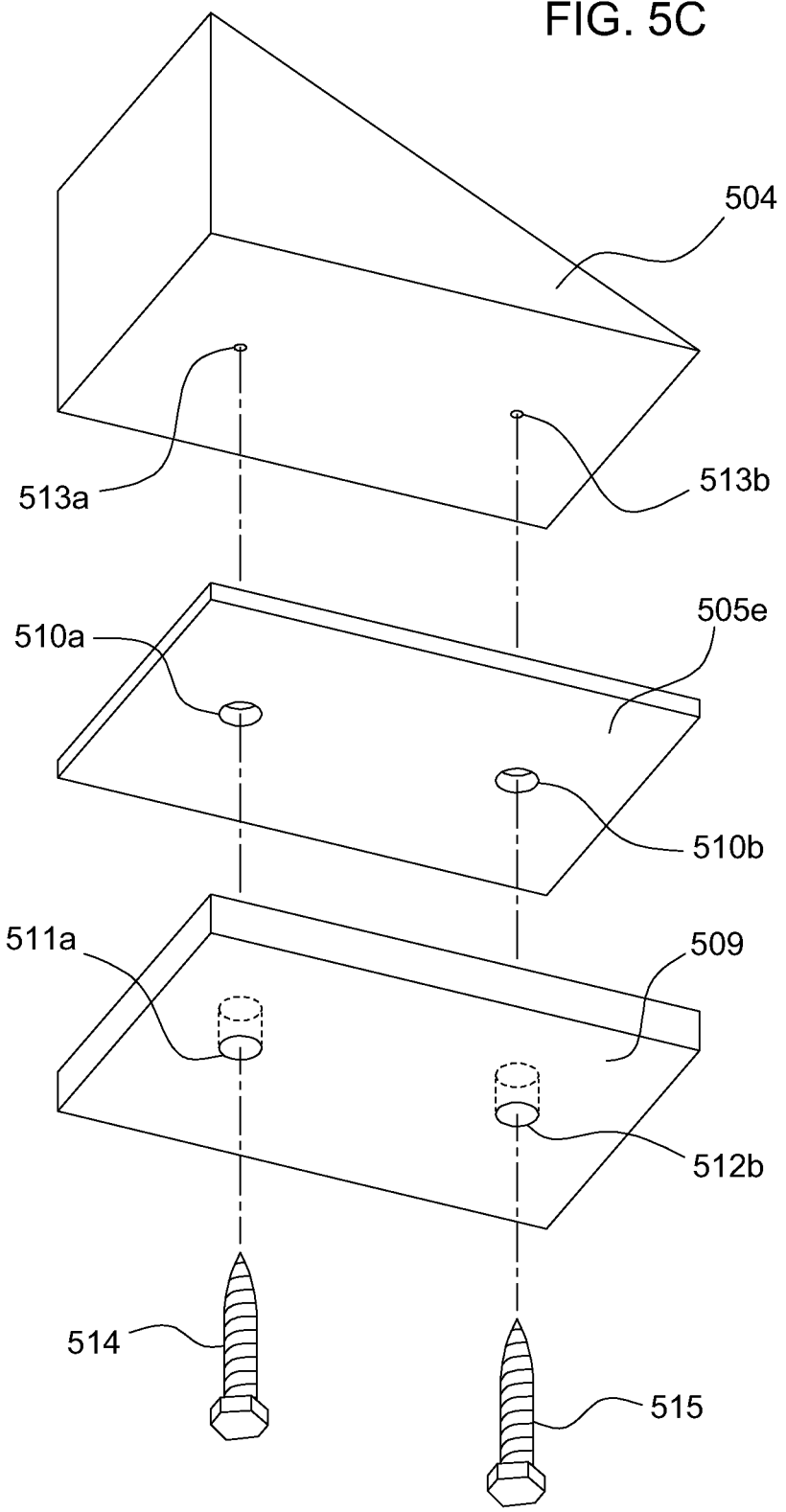
FIG. 5C is an exploded view of a grain elevator paddle insert included in the grain elevator illustrated in FIG. 5A.

FIG. 5C illustrates an exploded view of the paddle base unit. Paddle plate 509e includes first paddle plate opening 511a and second paddle plate opening 511b for receiving first fastener 514 and second fastener 415, respectively, through them. Paddle 505e includes first paddle opening 510a and second paddle opening 510b for receiving first fastener 514 and second fastener 515, respectively, through them. First fastener 514 and second fastener 515 may be inserted, or screwed, through first paddle plate opening 511a and second paddle plate opening 511b and further inserted, or screwed, through first paddle opening 510a and second paddle opening 510b before attaching to the paddle insert 504 through first paddle insert opening 513a and second paddle insert opening 513b, respectively.

According to some embodiments, first fastener 514 and second fastener 515 may only run through paddle plate 509e and paddle 505e such that first fastener 514 and second fastener 505 does not fasten, or attach, to the paddle insert 504. According to such embodiments, paddle insert 504 may be positioned on top of paddle 505e without being attached to any other component such as paddle 505e.

According to some embodiments, first fastener 514 and second fastener 515 may be a bolt or screw.

Although paddle insert 504 is illustrated in FIG. 5A as being positioned on top of only paddle 505e, according to other embodiments paddle insert 504 may be positioned on top of one or more of the plurality of paddles 505a-505h.

According to some embodiments, the angled slant provided by paddle insert 504 may be similarly achieved by installing any one or more paddle 505a-505h at an angle that corresponds to the angle of paddle insert 504 described herein. This may require, for some embodiments, a corresponding paddle plate 509a-509h to be configured at the angle corresponding to the angle of paddle insert 504 described herein so that the paddle 505a-505h may be installed at the angle of paddle insert 504.

Although specific embodiments have been illustrated and described herein, it will be appreciated by those of ordinary skill in the art and others, that a wide variety of alternate and/or equivalent implementations may be substituted for the specific embodiment shown and described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

What is claimed is:

1. A grain elevator paddle assembly for transporting grain on a grain elevator, the grain elevator paddle assembly comprising:
   a grain elevator drive including a drive connector;
   a paddle base positioned between a first wall and a second wall of the grain elevator, the paddle base comprising a paddle base connector configured to engage with the drive connector of the grain elevator drive via a fastener, and a paddle base transporter attached to the paddle base connector;
   a paddle divider perpendicular to the paddle base transporter, the paddle divider configured to divide the paddle divider into a first paddle base side of the paddle base transporter between the first wall and the paddle divider, and a second paddle base side of the paddle base transporter between the second wall and the paddle divider, and
   a sampling receptacle, wherein the second paddle base side corresponds to a side of the grain elevator configured to have an opening to the sampling receptacle.

2. The grain elevator paddle assembly of claim 1, wherein the paddle base connector and the drive connector include at least two openings, respectively; and
   wherein the fastener comprises at least two bolts configured to engage the paddle base connector with the drive connector through the at least two openings.

3. The grain elevator paddle assembly of claim 1, wherein the paddle divider is configured to define a length of the first paddle base side to be substantially equal to a length of the second paddle base side.

4. The grain elevator paddle assembly of claim 1, wherein the first paddle base side of the paddle base transporter and the paddle divider define, at least in part, a first holding well configured to carry grain, and
   wherein the second paddle base side of the paddle base transporter and the paddle divider define, at least in part, a second holding well configured to carry grain.

5. The grain elevator paddle assembly of claim 4, wherein the second holding well is configured to enable grain to go through the opening and enter into the sampling receptacle.

6. The grain elevator paddle assembly of claim 5, wherein the sampling receptacle includes a moisture sensor configured to sense a moisture content of the grain within the sampling receptacle.

7. The grain elevator paddle assembly of claim 5, wherein the sampling receptacle includes an infrared sensor configured to sense at least one of a protein characteristic or starch characteristic grain within the sampling receptacle.

8. The grain elevator paddle assembly of claim 5, wherein the sampling receptacle includes a camera configured to record grain within the sampling receptacle.

9. A grain elevator paddle assembly for transporting grain on a grain elevator, the grain elevator paddle assembly comprising:
   a grain elevator drive including a drive connector,
   a paddle base positioned between a first wall and a second wall of the grain elevator, the paddle base comprising a paddle base connector configured to engage with the drive connector via a fastener and a paddle base transporter attached to the paddle base connector;
   an angled paddle insert attached to the paddle base transporter—the angled paddle insert having a slope surface angled downwards from the first wall to the second wall of the grain elevator, and
   a sampling receptacle, wherein the second wall of the grain elevator corresponds to a side of the grain elevator configured to have an opening to the sampling receptacle.

10. The grain elevator paddle assembly of claim 9, wherein the paddle base connector, the angled paddle insert, and the drive connector comprises at least two openings, respectively, and;
    wherein the fastener comprises at least two bolts configured to engage the at least two openings of the paddle base connector, the angled paddle insert, and the drive connector, respectively.

11. The grain elevator paddle assembly of claim 9, wherein the angled paddle insert is detachable from the paddle base.

12. The grain elevator paddle assembly of claim 9, wherein a slope of the angled paddle insert from the first paddle base side to the second paddle base side is configured to enable grain carried on the angled paddle insert to enter into the sampling receptacle through the opening.

13. The grain elevator paddle assembly of claim 12, wherein the sampling receptacle includes a moisture sensor configured to sense a moisture content of the grain within the sampling receptacle.

14. The grain elevator paddle assembly of claim 12, wherein the sampling receptacle includes an infrared sensor configured to sense at least one of a protein characteristic or starch characteristic grain within the sampling receptacle.

15. The grain elevator paddle assembly of claim 12, wherein the sampling receptacle includes a camera configured to record grain within the sampling receptacle.

16. The grain elevator paddle assembly of claim 12, wherein the slope of the angled paddle insert corresponds to an angle of at least 30 degrees.

17. The grain elevator paddle assembly of claim 12, wherein the slope of the angled paddle insert corresponds to an angle of at least 60 degrees.

18. A grain elevator paddle insert of a grain elevator, the grain elevator paddle insert comprising:
    an angled paddle insert attached to a paddle base transporter, the angled paddle insert having a slope surface angled downwards from a first wall to a second wall of the grain elevator, and
    a sampling receptacle, wherein the second wall of the grain elevator corresponds to a side of the grain elevator configured to have an opening to the sampling receptacle.

19. The grain elevator paddle insert of claim 18, wherein the slope of the grain elevator paddle insert from the first insert side to the second insert side is configured to enable grain carried on the angled paddle insert to enter into the sampling receptacle through the opening.

20. A grain elevator paddle assembly for transporting grain on a grain elevator, the grain elevator paddle assembly comprising:
    having a grain elevator drive including a drive connector including at least two openings,
    a paddle base comprising a paddle base transporter and a paddle base connector including at least two openings;
    an angled paddle insert including at least two openings and configured to rest on top of the paddle base transporter and comprising a slope angled downwards from a first paddle base side to a second paddle base side,
    a sampling receptacle, wherein the second paddle base side corresponds to a side of the grain elevator configured to have an opening to the sampling receptacle, and
    a fastener including at least two bolts configured to engage with the at least two openings of the paddle base connector, the drive connector and the angled paddle insert.

* * * * *